United States Patent
Zhang et al.

(10) Patent No.: US 6,718,062 B1
(45) Date of Patent: Apr. 6, 2004

(54) SYSTEM AND METHOD FOR MATCHING CURVES OF MULTIPLE IMAGES REPRESENTING A SCENE

(75) Inventors: Zhengyou Zhang, Redmond, WA (US); Ying Shan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 684 days.

(21) Appl. No.: 09/584,013

(22) Filed: May 30, 2000

(51) Int. Cl.$^7$ ................................................ G06K 9/68
(52) U.S. Cl. ........................ 382/218; 382/199; 382/154
(58) Field of Search ............................... 382/154, 215, 382/199, 190, 195, 205, 209, 218, 219; 345/419, 420; 356/2, 12

(56) References Cited

U.S. PATENT DOCUMENTS 5,383,013 A * 1/1995 Cox .............................. 356/2
6,466,695 B1 * 10/2002 Potzsch et al. ............. 382/199

OTHER PUBLICATIONS

Nasrabadi, "A Stereo Vision Technique Using Curve–Segments and Relaxation Matching." IEEE Transactions on Pattern Analysis and Machine Intelligence, vol. 14, No. 5, 1992, p. 566–572.*

William J. Christmas, Josef Kittler, and Maria Petrou. Structural matching in computer vision using probabilistic relaxation. IEEE Trans. PAMI, 17(8): 749–764, Aug. 1995.

Stephen B. Pollard, John E.W. Mayhew, and John P. Frisby. PMF: A stereo correspondence algorithm using a disparity gradient limit. In John E.W. Mayhew and John P. Frisby, editors, 3D model recognition from stereoscopic cues, pp. 11–25. MIT Press, 1991.

* cited by examiner

Primary Examiner—Mehrdad Dastouri
Assistant Examiner—Virginia Kibler
(74) Attorney, Agent, or Firm—Lyon & Harr, LLP; Richard T. Lyon (57) ABSTRACT

The present invention is embodied in a system and method for curve matching multiple images of a scene. The curve matching produces a geometrical representation of the scene from the images, which can be used for any suitable application, such as computer and stereo vision applications. In general, first, multiple images depicting a scene are digitally received by the system. The images are graphical images digitally received and processed as two dimensional image data, such as bitmap or raster image data. Curve matching of the images is then performed to correlate the two images of the scene for creating three dimensional (3D) curve information, such as 3D vector information, of the scene. This 3D vector information can then be used in any suitable manner, for example, to digitally reconstruct the scene for stereo vision applications.

22 Claims, 5 Drawing Sheets

SYSTEM AND METHOD FOR MATCHING CURVES OF MULTIPLE IMAGES REPRESENTING A SCENE

BACKGROUND OF THE INVENTION

1. Field of the Invention

The present invention relates in general to processing digital data, and in particular, to a system and method for matching curves of multiple images representing a scene for stereo vision applications.

2. Related Art

For stereo vision applications, accurate vector or mathematical representations of objects or scenes derived from two dimensional image data are very important. Vector or mathematical representations of a scene can be comprised of curve information derived from an image. Reliable curve matching is a difficult problem but is required in many vision-based applications. Curve matching is particularly difficult when the edges in question, such as for a general scene, are not limited to be on straight lines.

Although many techniques exist for detecting the edges of a scene, these techniques, however, have difficulties when applied to more general scenes. For example, some techniques use line matching methods applied to scenes containing mainly planar surfaces. However, they are not suitable for scenes containing curves because the line model is insufficient to describe curves. In addition, they are not suitable for scenes that are taken by a camera close to the scene, where the local affinity or similarity assumption for long line segments is not valid. Further, the projection of straight lines in 3D onto images may no longer be straight due to radial lens distortion.

Some problems related to curve matching are the design of good unary and binary measurements, and the definition of appropriate similarity and compatibility functions. Previous techniques and methods for curve matching provided examples on the unary measurements and similarity function between curves. Nevertheless, these previous methods were limited when dealing with binary measurements and compatibility functions. Namely, their compatibility functions were usually computed from measurements such as disparity or disparity gradient, which are only suitable for the description of relationships between two pairs of points, and are not scale invariant.

Therefore, what is needed is a system and method that solves the problems that prior methods encounter with general scenes with a system that performs curve matching (including lines) within a probabilistic relaxation framework. What is also needed is a system the uses the relaxation framework to progressively reduce the matching.

SUMMARY OF THE INVENTION

To overcome the limitations in the prior art as described above and other limitations that will become apparent upon reading and understanding the present specification, the present invention is embodied in a system and method for matching curves of multiple images representing a scene. The curve matching produces a geometrical representation of the scene from the images, which can be used for any suitable application, such as computer and stereo vision applications.

In general, first, multiple images depicting a scene are digitally received by the system. The images are graphical images digitally received and processed. For example, the images can be two dimensional image data, such as bitmap or raster image data. Curves of the images are then matched to correlate the two images of the scene for creating three dimensional (3D) curve information, such as 3D vector or mathematical information, of the scene. This 3D vector information can then be used in any suitable manner, for example, to digitally reconstruct the scene for stereo vision applications.

The present invention performs the curve matching (including lines) preferably within a probabilistic relaxation framework. The relaxation framework is used to progressively reduce the matching ambiguity. In other words, the relaxation framework is used to handle the curves and explicitly model uncertainty in line segment measurements. Epipolar geometry can be used to reduce the matching ambiguity between the line segments. Similarity-invariant unary and binary measurements suitable for curves are developed. An additional measurement can be introduced to model the uncertainty of the binary measurements, which can then be used to compute the matching support from neighboring matches. The present invention also includes preprocessing techniques to enhance curve matching.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Exemplary Operating Environment

Figure 1:
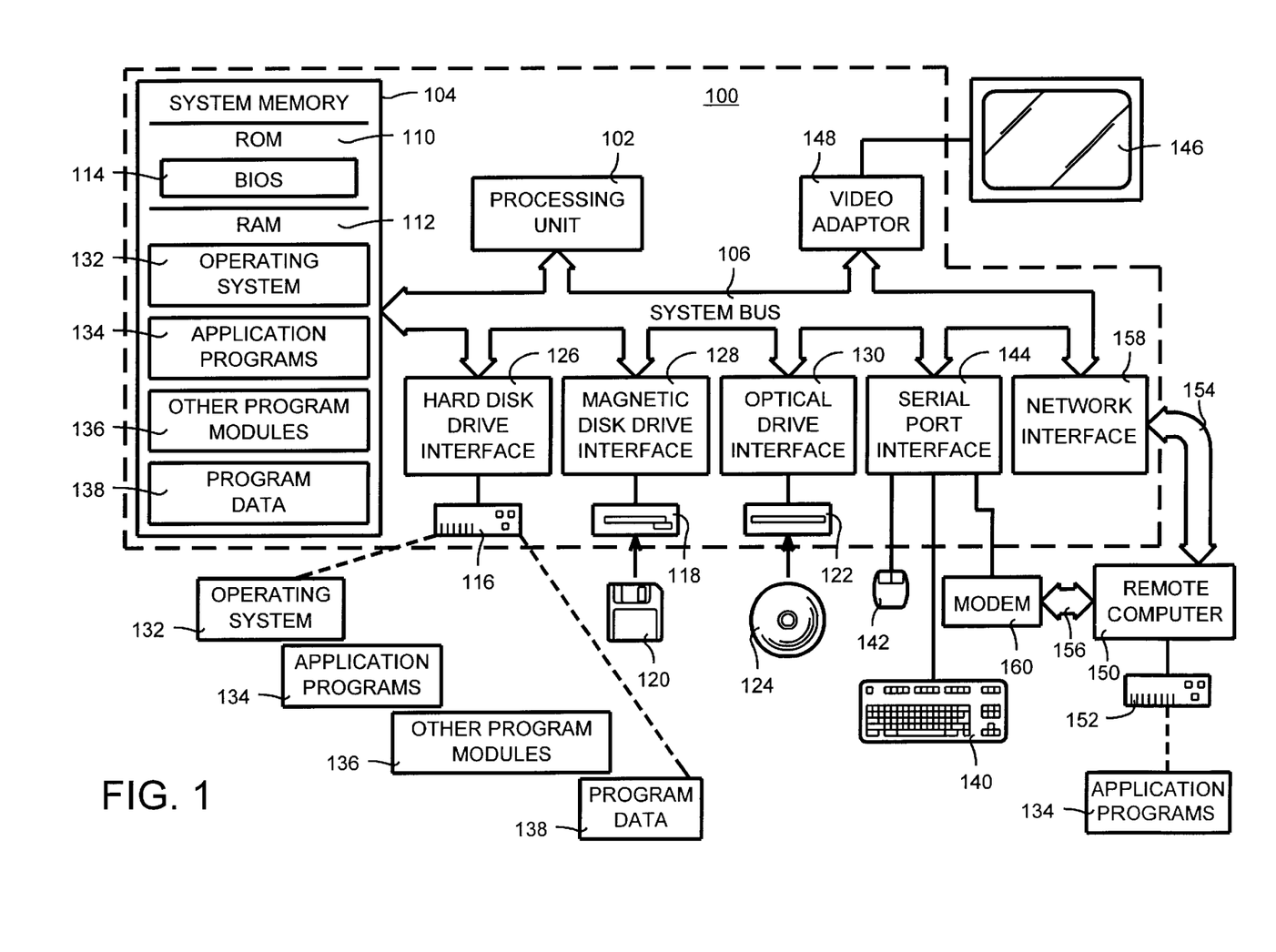
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used, such as a direct connection via an integrated services digital network (ISDN) connection.

II. Introduction

Reliable curve matching of images representing a scene is important and desirable in many vision-based applications, especially when the edges of the images in question are not limited to be on straight lines. The present invention provides reliable curve matching of multiple images representing scenes, including general scenes where edges are not limited to be on straight lines. Curve matching in accordance with the present invention produces a geometrical representation of the scene from the images, which can be used for any suitable application, such as computer and stereo vision applications.

In general, the present invention can be embodied in a computer hardware or software system that matches curves (including lines) within a probabilistic relaxation framework. Similarity-invariant unary and binary measurements suitable for curves are computed. Also, a measurement to model the uncertainty of the binary measurements is computed. This measurement is used for determining matching support from neighboring matches.

III. General Overview

Figure 2:
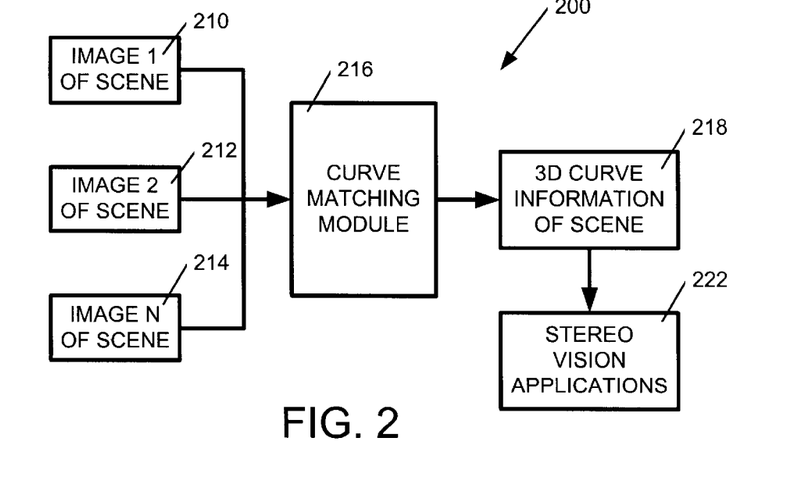
FIG. 2 is a general block diagram illustrating a system processing multiple images of a scene for stereo vision applications in accordance with the present invention.

FIG. 2 is a general block diagram illustrating a curve matching system for processing multiple images of a scene in accordance with the present invention. The system 200 can be used for any suitable computer application, such as computer or stereo vision applications. In general, image 1, image 2, . . . , image N (210, 212, 214) depicting a scene are digitally received by the system 200. The images (210, 212, 214) can be graphical images taken by a camera and containing two dimensional image data of the scene, in any suitable format, such as bitmap or raster image data format.

A curve matching module 216 receives the images (210, 212, 214) and correlates the images to each other by matching the curves of the images (210, 212, 214). The matched curves of the images represent geometrical three dimensional (3D) curve information 218, such as 3D vector information, of the scene. This 3D vector information geometrically represents the scene and can be used in any suitable manner, for example, to digitally reconstruct the scene for stereo vision applications 220.

The present invention reliably performs curve matching for a scene given at least two images of the scene. The present invention can also reliably perform curve matching when the edges of an object of the scene in question are not limited to be on straight lines. The present invention solves the problems discussed above that prior methods encounter with general scenes by performing curve matching (including lines) within a probabilistic relaxation framework. The relaxation framework is used to progressively reduce the matching ambiguity and will be discussed in detail below.

Figure 3:
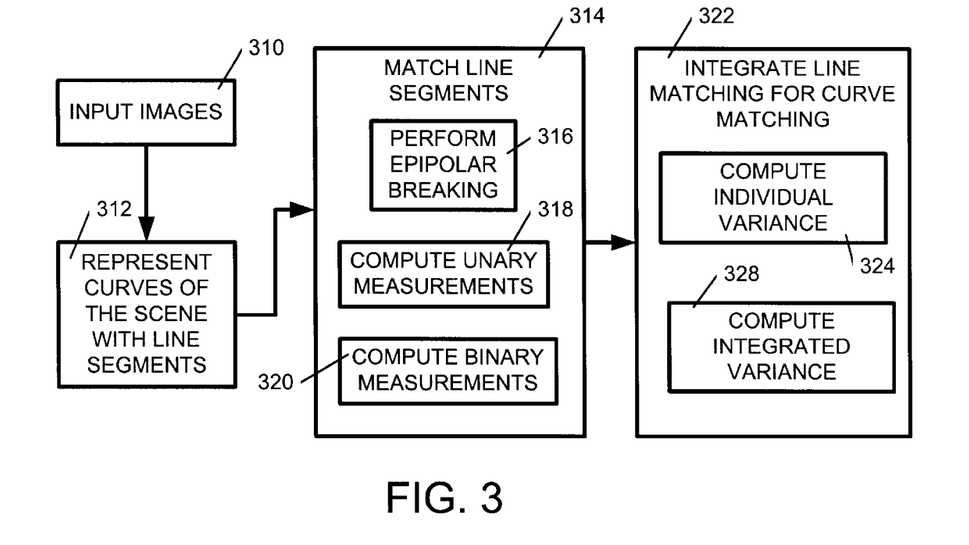
FIG. 3 is a flow diagram for curve matching multiple images of a scene in accordance with the present invention.

FIG. 3 is a flow diagram for curve matching multiple images of a scene in accordance with the present invention. In general, referring to FIG. 2 along with FIG. 3, first, images (210, 212, 214) are received by the system (step 310). The images (210, 212, 214) are graphical images, such as two dimensional bitmap or raster image data. Second, curves of the images (210, 212, 214) are represented as line segments (step 312) and the line segments are matched (step 314). Optionally, epipolar geometry can be used to break curves appropriately in order to reduce the matching ambiguity. Epipolar breaking techniques of the present invention (step 316) reduce matching complexity and will be discussed in detail below.

With regard to the line segments, a piecewise linear model is used to approximate curves with the line segments. The line segments of the images (210, 212, 214) are matched by computing unary and binary measurements (steps 318, 320). The relaxation framework of the present invention deals with curves and explicitly models the uncertainty in the binary measurements. For example, a set of binary measurements for the line segments can be computed, which are similarity-invariant and measured in the same physical space. The set of binary measurements are then integrated to provide a set of binary measurements and a compatibility function for the complete curve.

Last, the uncertainty in the combined binary measurements is progressively modeled for reducing ambiguities in the combined binary measurements by integrating line matching for curve matching (step 322). Namely, criteria of the line matching is integrated into criteria of curve matching. This is accomplished by first computing an individual variance or uncertainty of combined binary measurements for matched line segments of each curve (step 324). A global minimal variance criterion is then used to compute an integrated variance for the entire curve based on the individual variance of each matched line segment (step 328), which will be discussed in detail below.

IV. Operation

Referring back to FIG. 2 along with FIG.3, information that can be used for curve matching falls into three categories, i.e., the geometrical constraint, the similarity between the curves, and the compatibility among the neighborhood matches. One important geometric constraint between views is the epipolar constraint, which is typically used in curve-based stereo matching systems for reducing the search space. Epipolar lines can be defined as horizontal scan lines, but are not restricted to be horizontal (the fundamental matrix can be used to define the epipolar geometry).

The similarity function between two curves is usually defined in a high dimensional feature space. The features may include attributes such as the intensity in the neighborhood, orientation, and the local shape characteristics. These are the unary measurements. The compatibility function among neighboring matches is usually defined by the relationship between neighboring pairs of matches. The compatibility function is usually related to the local affinity or similarity assumption, and the binary measurements, defining the relationship, could be the angle and distance between a pair of neighboring curves.

The relaxation technique of the present invention integrates the similarity function and the compatibility function to progressively reduce the matching ambiguity. Curves include both straight and non-straight edges. Edge points can be detected in sub-pixel accuracy by finding the zero-crossing between the integer pixels on the DOG (difference of Gausian) image. Adjacent edge points are then linked together into connected edge chains (also called curves for simplicity). The linking process does not include any heuristic processing such as one-pixel gap filling or straight line fitting. An edge chain (curve) is represented as a linked list, and is parameterized by the index variable.

The present invention also considers the uncertainty in the binary measurements. It should be noted that the local affinity or similarity assumption is only valid within a limited area of the image. Binary measurements obtained from curves far away from each other have more uncertainty than those from nearby curves. In the present invention, this is reflected in the computation of the compatibility function.

IV. Working Example and Real World Implementation

Figure 4:
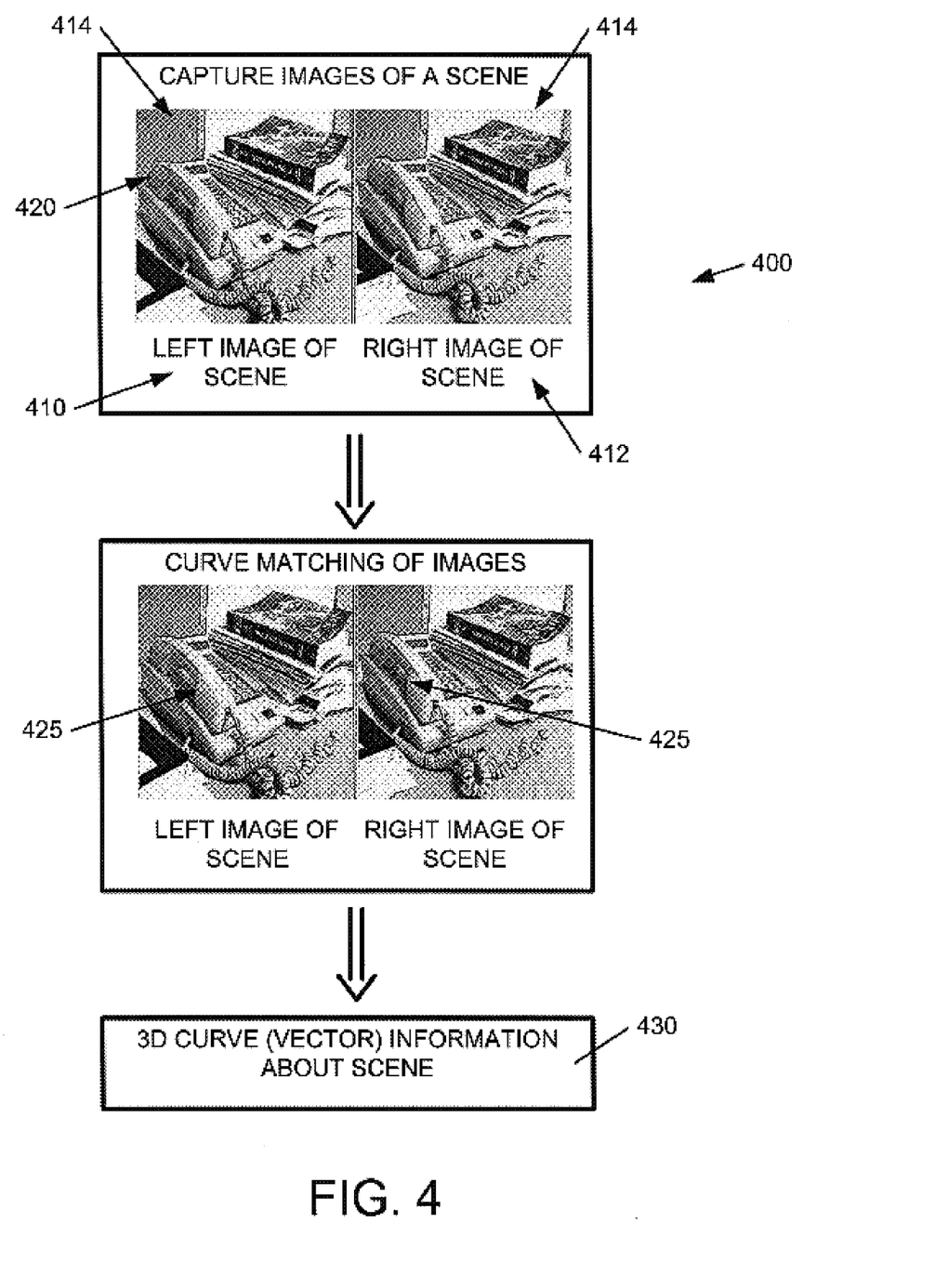
FIG. 4 is a working example of FIG. 3 for curve matching two images of a scene in accordance with the present invention.

FIG. 4 is a working example of FIG. 3 for curve matching two images of a scene in accordance with the present invention. In the example 400, in general, a left image 410 and a right image 412 of a scene 414 are captured by any suitable means. Edges or curves 420 of each image 410, 412 defining the objects of the scene 414 are matched with the curve matching module 216 of FIG. 2. The matched curves 425 are used to determine a geometrical representation of the scene 414 in the form of curve information 430, which can be used in stereo matching applications.

A. A Probabilistic Relaxation Framework

A probabilistic relaxation framework for structural matching is used by the present invention. For notational purposes, curve matching is modeled as a labeling problem from the object space (left image 410) to the model space (right image 412). There are $\mathcal{N}$ curves in the left image, and $\mathcal{M}$ in the right. The curves in the left image form the object space, denoted by $\mathcal{A}=\{a_1, \ldots, a\mathcal{N}\}$. The curves in the right image form the model space, each labeled as $\omega_j$. As discussed above, the object 410 is matched to the model 412. Thus, assigned to each object, $a_i$ is a label $\theta_i$, which may take as its value any of the $\mathcal{M}+1$ model labels that form the set $\Omega=\{\omega_0, \omega_1, \ldots, \omega\mathcal{M}\}$, where $\omega_0$ is the null label used to label curves for which no match in the right image is appropriate. Four sets of indices are defined for convenience as:

$\mathcal{N}_0=\{1, \ldots, \mathcal{N}\}$, $\mathcal{N}_i=\{j|j\in\mathcal{N}_0, j\neq i\}$,
$\mathcal{M}_0=\{0, \ldots, \mathcal{M}\}$, and $\mathcal{M}_i=\{j|j\in\mathcal{M}_0, j\neq i\}$.

The unary measurement set is defined as $\mathcal{X}=\{x_i | i \in \mathcal{N}_0\}$ where $x_i$ is the unary measurement vector for the object $a_i$. Unary measurements include intensity similarity, and will be addressed below. The binary measurement set for the object $a_i$ is defined as $\mathcal{A}_i=\{A_{ij} | j \in \mathcal{N}_i\}$, where $A_{ij}$ is the vector of binary measurements between objects $a_i$ and $a_j$. Binary measurements include distance between two curves, and will be discussed below. A special measurement set $\mathcal{B}_i=\{B_{ij} | j \in \mathcal{N}_i\}$ is also defined, where $B_{ij}$ is the uncertainty measurement to be defined later. Upper-case P is used to denote the probability of an event, lower-case p is used to denote the probability density function, and $\mathcal{N}_v(\mu, \Sigma)$ to denote the Gaussian probability density function of a random vector v with the mean $\mu$ and the covariance matrix $\Sigma$.

1. A Framework With Uncertainty Measurement:

With the above notation, the matching problem becomes that of finding for object $a_i$ a model label $\omega_{\theta_i}$ with the highest probability given the measurements $\mathcal{X}, \mathcal{A}_i,$ and $\mathcal{B}_i$:

$$P(\theta_i = \omega_{\theta_i} | X, \mathcal{A}_i, \mathcal{B}_i) = \max_{\omega_\lambda \in \Omega} P(\theta_i = \omega_\lambda | X, \mathcal{A}_i, \mathcal{B}_i) \quad (1)$$

For the convenience of the discussion that follows, the notation of the event set is introduced as $\mathcal{L}^\lambda = \{\theta_i = \omega_\lambda\} \cup \{\theta_j = \omega_{\theta_j} | j \in N_i\}$ to indicate that object $a_i$ is labeled with a given label $\omega_\lambda$ while other objects can change their labels. For $\mathcal{L}^{\theta_i}$, the ith event $\mathcal{L}_i^{\theta_i}$ is equivalent to event $\theta_i = \omega_{\theta_i}$. Using Bayes' formula and the theorem of total probability, the result is:

$$p(\mathcal{L}_i^{\theta_i} | X, \mathcal{A}_i, \mathcal{B}_i) = \frac{p(\mathcal{L}_i^{\theta_i}, X, \mathcal{A}_i, \mathcal{B}_i)}{p(X, \mathcal{A}_i, \mathcal{B}_i)} \quad (2)$$

$$= \frac{\sum_{\{\omega_{\theta_j} \in \Omega, j \in N_i\}} p(\mathcal{L}_i^{\theta_i}, X, \mathcal{A}_i, \mathcal{B}_i)}{\sum_{\omega_\lambda \in \Omega} \sum_{\{\omega_{\theta_j} \in \Omega, j \in N_i\}} p(\mathcal{L}^\lambda, X, \mathcal{A}_i, \mathcal{B}_i)}$$

By applying the product rule for $p(\mathcal{L}^\lambda, \mathcal{X}, \mathcal{A}_i, \mathcal{B}_i)$, the following is produced:

$$p(\mathcal{L}^\lambda, X, \mathcal{A}_i, \mathcal{B}_i) = p(X | \mathcal{L}^\lambda, \mathcal{A}_i, \mathcal{B}_i) p(\mathcal{L}^\lambda, \mathcal{A}_i, \mathcal{B}_i) \quad (3)$$

$$= p(X | \mathcal{L}^\lambda) p(\mathcal{A}_i | \mathcal{L}^\lambda, \mathcal{B}_i) p(\mathcal{L}^\lambda, \mathcal{B}_i)$$

$$= p(X | \mathcal{L}^\lambda) P(\mathcal{L}^\lambda) p(\mathcal{A}_i | \mathcal{L}^\lambda, \mathcal{B}_i) p(\mathcal{B}_i)$$

$$= P(\mathcal{L}^\lambda | X) p(\mathcal{A}_i | \mathcal{L}^\lambda, \mathcal{B}_i) p(X) p(\mathcal{B}_i)$$

where the second equation holds because $\mathcal{X}$ (unary measurement set) does not depend on $\mathcal{A}_i$ (binary measurement set) and $\mathcal{B}_i$ (uncertainty of the binary measurement set), and the third equation holds because $\mathcal{L}^\lambda$ and $\mathcal{B}_i$ are independent. Since there is no knowledge about $\mathcal{X}$ and $\mathcal{B}_i$, $p(\mathcal{X})$ and $p(\mathcal{B}_i)$ are constants. Substituting (3) into (2) produces:

$$p(\mathcal{L}_i^{\theta_i} | X, \mathcal{A}_i, \mathcal{B}_i) = \frac{\sum_{\{\omega_{\theta_j} \in \Omega, j \in N_i\}} P(\mathcal{L}^{\theta_i} | X) p(\mathcal{A}_i | \mathcal{L}^{\theta_i}, \mathcal{B}_i)}{\sum_{\omega_\lambda \in \Omega} \sum_{\{\omega_{\theta_j} \in \Omega, j \in N_i\}} P(\mathcal{L}^\lambda | X) p(\mathcal{A}_i | \mathcal{L}^\lambda, \mathcal{B}_i)} \quad (4)$$

Assuming that the events in the $\mathcal{L}^\lambda$ are independent, it follows that:

$$P(\mathcal{L}^\lambda | X) = P(\theta_i = \omega_\lambda | x_i) \prod_{j \in N_i} P(\theta_j = \omega_{\theta_j} | x_j)$$

Since $A_{ij}$ only depends on the ith and jth events in $\mathcal{L}^\lambda$ and $B_{ij}$, and since $A_{ij}$s are independent from each other, the following is true:

$$p(\mathcal{A}_i | \mathcal{L}^\lambda, \mathcal{B}_i) = \prod_{j \in N_i} p(\mathcal{A}_{ij} | \theta_i = \omega_\lambda, \theta_j = \omega_{\theta_j}, B_{ij})$$

With the following simple notation $$P_j^\lambda = P(\theta_j = \omega_{\theta_j} | x_j) p(\mathcal{A}_{ij} | \theta_i = \omega_\lambda, \theta_j = \omega_{\theta_j}, B_{ij})$$

it follows that:

$$\sum_{\{\omega_{\theta_j} \in \Omega, j \in N_i\}} P(\mathcal{L}^\lambda | X) p(\mathcal{A}_i | \mathcal{L}^\lambda, \mathcal{B}_i) \quad (5)$$

$$= P(\theta_i = \omega_\lambda | x_i) \sum_{\omega_{\theta_1} \in \Omega} P_1^\lambda \ldots \sum_{\omega_{\theta_N} \in \Omega} P_N^\lambda$$

$$= P(\theta_i = \omega_\lambda | x_i) \prod_{j \in N_i} \sum_{\omega_{\theta_j} \in \Omega} P_j^\lambda$$

Substituting (5) into (4) leads immediately to $$P(\theta_i = \omega_{\theta_i} | X, \mathcal{A}_i, \mathcal{B}_i) = \frac{P(\theta_i = \omega_{\theta_i} | x_i) Q(\theta_i = \omega_{\theta_i})}{\sum_{\omega_\lambda \in \Omega} P(\theta_i = \omega_\lambda) Q^{(n)}(\theta_i = \omega_\lambda)} \quad (6)$$

where the support function is given by $$Q(\theta_i = \omega_\alpha) = \prod_{j \in N_i} \sum_{\omega_\beta \in \Omega} P_j^\beta \quad (7)$$

$$= \prod_{j \in N_i} \sum_{\omega_\beta \in \Omega} P(\theta_j = \omega_\beta | x_j)$$

$$p(\mathcal{A}_{ij} | \theta_i = \omega_\alpha, \theta_j = \omega_\beta, B_{ij})$$

where the first item in the summation is the similarity function, and the second is the compatibility function that takes into account explicitly the uncertainty measurement Bij.

Based on (6), the labeling probability is updated in a relaxation scheme according to the following iterative equation:

$$P^{(n+1)}(\theta_i = \omega_{\theta_i}) = \frac{P^{(n)}(\theta_i = \omega_{\theta_i})Q^{(n)}(\theta_i = \omega_{\theta_i})}{\sum_{\omega_\lambda \in \Omega} P^{(n)}(\theta_i = \omega_\lambda)Q^{(n)}(\theta_i = \omega_\lambda)} \quad (8)$$

Where n is the iteration number, and $P^{(0)}(\theta_i = \omega_{\theta_i}) = P(\theta_i = \omega_{\theta_i} | x_i)$. The iteration process terminates if the change in the probabilities is less than a predefined small value or the maximum number of iterations is reached.

As has been mentioned above, candidate curves in the right view for the current curve $a_j$ in the left view are found by the epipolar geometry. This is equivalent to reducing the model label set for $a_j$ from $\Omega$ to $\Omega_j$ in the above derivations. Since the size of $\Omega_j$ is usually much smaller than that of $\Omega$, the computational efficiency of the relaxation process is increased considerably.

2. Adapted Framework With Combined Measurements

In the present invention, the unary and binary measurements depend on information in both object and model space (i.e., left and right image 410, 412). Therefore, measurements for combined object-model pairs are considered. Namely, let $x_i^{(\alpha)}$ ($\alpha \in \mathcal{M}_0$) be the combined unary measurement defined for the pair of the ith object and the $\alpha$th model. The unary measurement of object $a_i$, $x_i$, is then itself a set of combined unary measurements, i.e., $\{x_i^{(\alpha)} | \alpha \in \mathcal{M}_0\}$. Let $A_{ij}^{(\alpha\beta)}$ ($\alpha \in \mathcal{M}_0, \beta \in \mathcal{M}_0$) be the combined binary measurement defined for two object-model pairs $(i,\alpha)$ and $(j,\beta)$. Then, the binary measurement $A_{ij}$ is itself a set of combined binary measurements, i.e., $\{A_{ij}^{(\alpha\beta)} | \alpha \in \mathcal{M}_0, \beta \in \mathcal{M}_0\}$.

In order to adapt the framework for working with the combined measurements, a similarity function is first considered, as discussed in Structural matching in computer vision using probabilistic relaxation by William J. Christmas, Josef Kittler, and Maria Petrou, IEEE Trans. PAMI, 17(8):749–764, August 1995, which is incorporated herein by reference. Since the event $\theta_j = \omega_\beta$ does not depend on the combined unary measurements other than the $x_j^{(\beta)}$, it follows that:

$$P(\theta_j = \omega_\beta | \{x_j^{(\beta)} | \beta \in \mathcal{M}_0\}) = P(\theta_j = \omega_\beta | x_j^{(\beta)}) \quad (9)$$

Similarly, $\mathcal{A}_{ij}^{(\alpha\beta)}$'s are independent of each other, and hence:

$$p(A_{ij} | \theta_i = \omega_\alpha, \theta_j = \omega_\beta, B_{ij})$$
$$= p(\{A_{ij}^{kl}\} | \theta_i = \omega_\alpha, \theta_j = \omega_\beta, B_{ij})$$
$$= \prod_{\substack{k \in \mathcal{M}_0 \\ l \in \mathcal{M}_0}} p(A_{ij}^{kl} | \theta_i = \omega_\alpha, \theta_j = \omega_\beta, B_{ij})$$

For $A_{ij}^{(kl)}$ which are not equal to $A_{ij}^{(\alpha\beta)}$ (i.e., k and l are not matched with i and j), there is no information about how to compute the binary measurement $A_{ij}^{(kl)}$. Hence, it is assumed that the density function is a uniform distribution, i.e., a constant, within its domain. In consequence, it follows that:

$$p(A_{ij} | \theta_i = \omega_\alpha, \theta_j = \omega_\beta, B_{ij}) = \varepsilon \, p(A_{ij}^{(\alpha\beta)} | \theta_i = \omega_\alpha, \theta_j = \omega_\beta, B_{ij}) \quad (10)$$

where $\{A_{ij}^{(kl)}\}$ is the abbreviation of $\{A_{ij}^{(kl)} | k \in \mathcal{M}_0, l \in \mathcal{M}_0\}$ and $\varepsilon = \Pi_{\{kl \neq \alpha\beta\}} p(A_{ij}^{(kl)} | B_{ij})$ is a constant. Thus, by substituting (10) and (9) into (7),(7) into (6), and eliminating the constant, $\varepsilon$, (6) can be rewritten as:

$$P(\theta_i = \omega_{\theta_i} | X, \mathcal{A}_i, \mathcal{B}_i) = \frac{P(\theta_i = \omega_{\theta_i} | x_i^{(\theta_i)})Q(\theta_i = \omega_{\theta_i})}{\sum_{\omega_\gamma \in \Omega} P(\theta_i = \omega_\lambda | x_i^{(\lambda)})Q(\theta_i = \omega_\gamma)} \quad (11)$$

and (7) as:

$$Q(\theta_i = \omega_\alpha) = \prod_{j \in N_i} \sum_{\omega_\beta \in \Omega} P_j^\beta \quad (12)$$
$$= \prod_{j \in N_i} \sum_{\omega_\beta \in \Omega} P(\theta = \omega_\beta | x_j^{(\beta)})$$
$$= p(\mathcal{A}_{ij}^{(\alpha\beta)} | \theta_i = \omega_\alpha, \theta_j = \omega_\beta, B_{ij})$$

B. The Combined Unary Measurement and the Similarity Function

A combined unary measurement invariant to similarity (scaled Euclidean) transformation is developed below and the similarity function is computed based on it. It should be noted that preferably only selected seed points on both the left and the right curves are considered; the right seed points are obtained by intersecting the epipolar lines of the left seed points with the curve in the right image; and for each seed point on the left curve and its corresponding point on the right curve, a correlation score is computed between their neighborhoods. In addition, it is ensured that the score computation is less sensitive to the image transformation.

1. Seed Score

Figure 5:
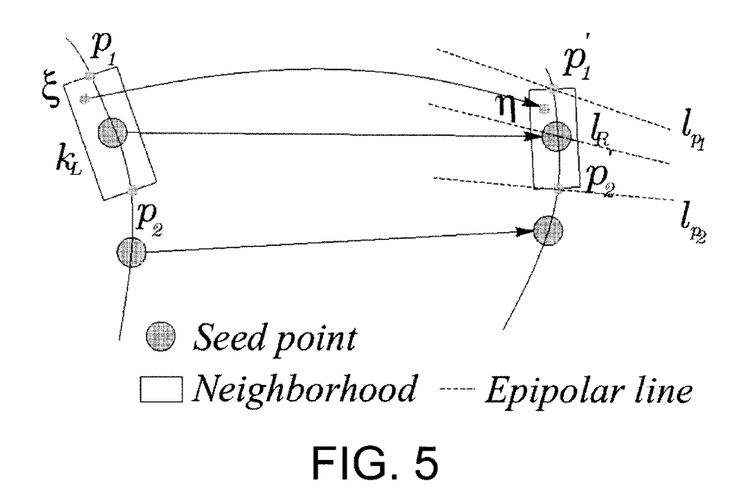
FIG. 5 is a neighborhood of a seed point in the left image and its correspondence in the right image of the working example of FIG. 4.

FIG. 5 is a neighborhood of a seed point in the left image and its correspondence in the right image of the working example of FIG. 4. For each seed point $k_L$ in the left image, a neighborhood $\mathcal{N}(k_L)$ is assigned. The neighborhood $\mathcal{N}(l_R)$ of the corresponding seed point $l_R$ on the right image is defined by $\mathcal{N}(k_L)$ and a similarity transformation.

A similarity transformation can be of the following form:

$$x' = sR_\theta x + t \quad (23)$$

where s is the scale, $R_\theta$ is the rotation matrix with angle $\theta$, and t is the translation vector. It maps a point x in one image to a point x' in the other. If there are two pairs of matched points $(p_1, p'_1)$ and $(p_2, p'_2)$ the following can be obtained:

$$\begin{cases} s = \dfrac{\|p'_1 - p'_2\|}{\|p_1 - p_2\|} \\ \cos\theta = \overline{(p_1 - p_2)} \cdot \overline{(p'_1 - p'_2)} \\ t = [(p'_1 + p'_2) - sR_\theta(p_1 + p_2)]2 \end{cases}$$

where $\bar{v}$ denotes the normalized vector of v.

The similarity transformation can be estimated from a pair of points inside the neighborhood and their corresponding points in the right image. The pair of seed points are already obtained, and another pair requires selection. The extreme point of $\mathcal{N}(k_L)$ can be chosen along the curve, $p_1$, and its corresponding point $p'_1$ can be computed by intersecting the epipolar line of $p_1, f_{p_1}$, with the curve in the right image. The estimation of the similarity transformation from two pairs of points was given above.

The seed score is computed as the correlation between these two corresponding neighborhoods, and is given by:

$$S(k_\mathcal{L}, l_R) = \sum_{\substack{\xi \in N(k_\mathcal{L}) \\ \eta \in N(l_R)}} \frac{[I_\mathcal{L}(\xi) - \bar{I}(k_\mathcal{L})][I_R(\eta) - \bar{I}(l_R)]}{\mathcal{N}_n \sigma(I_{k_\mathcal{L}}) \sigma(I_{l_R})} \quad (13)$$

where $I_i(\chi)$ is the intensity value on a point $\chi$ in the ith image, $\mathcal{N}(\chi)$ is the neighborhood for seed point $\chi$, $\eta$ is a point in the second image corresponding to point $\xi$ in the first image according to the similarity transformation described above, and $\mathcal{N}_n$ is the number of points in the neighborhood. The details of computing the mean ($\bar{I}(\chi)$) and the standard deviation ($\sigma(\chi)$) in $\mathcal{N}(\chi)$ can be found in Epipolar geometry in stereo by Gang Xu and Zhengyou Zhang. Motion and Object Recognition, Kluwer Academic Publishers, 1996, which is incorporated herein by reference. The correlation score thus computed is invariant under the similarity transformation.

2. The Curve Score as the Combined Unary Measurement

The curve score $\mathcal{L}(i_\mathcal{L}, j_R)$ for the ith curve in the left image 410 and the jth curve in the right image 412, which is the combined unary measurement in the context, is the average of all possible seed scores. That is, $$\mathcal{L}(i_\mathcal{L}, j_R) = \frac{1}{\mathcal{N}_i} \sum_{\substack{k_\mathcal{L} \in Sd(i_\mathcal{L}) \\ l_R \in Sd(j_R)}} S(k_\mathcal{L}, l_R) \quad (14)$$

where $\mathcal{N}_i$ is total number of seed points on $i_\mathcal{L}$, and $Sd(i_\mathcal{L})$ and $Sd(j_R)$ are the seed point sets of the left and right curves, respectively.

3. Similarity Function

The similarity function can be computed as follows. The combined unary measurement $x_i^{(\alpha)}$ in (11) is a scalar, and is denoted by $\chi_i^\alpha$. It is equal to $\mathcal{L}(\theta_i, \omega_\alpha)$ computed above. According to Bayes' theorem, $$P(\theta_i = \omega_{\theta_i} | x_i^{(\alpha)}) = \frac{p(x_i^{(\alpha)} | \theta_i = \omega_\alpha) \hat{P}(\theta_i = \omega_\alpha)}{\sum_{\omega_\lambda \in \Omega} p(x_i^{(\alpha)} | \theta_i = \omega_\lambda) \hat{P}(\theta_i = \omega_\lambda)} \quad (15)$$

where $\hat{P}(\theta_i = \omega_\lambda)$ is the prior probability equal to a prefixed value $\zeta$ if $\lambda = 0$ (i.e., no match), and to $(1-\zeta)/\mathcal{M}_0$ otherwise. It is assumed that $p(x_i^{(\lambda)} | \theta_i = \omega_\lambda) = \mathcal{N}(\mu_l, \sigma_l)$. The value of $\mu_l$ and $\sigma_l$ can be computed from the histogram of $x_i^{(\lambda)}$ using the initial matches. The initial matches could be obtained by selecting only the labeling with $x_i^{(\lambda)}$ that is the highest in both $\{x_i^{(\beta)} | \beta \in \mathcal{M}_0\}$ and $\{x_j^{(\gamma)} | j \in \mathcal{N}_0\}$.

The unary measurements are used in (15) to compute $P(\theta_i = \omega_\alpha | x_i^{(\alpha)})$. It is then used to initialize the relaxation scheme, that is:

$$P^{(0)}(\theta_i = \omega_\alpha) = P(\theta_i = \omega_\alpha | x_i^{(\alpha)}).$$

It should be noted that since the unary measurement is similarity invariant, there is no need to introduce a motion related term for the computation of the similarity function.

C. The Combined Binary Measurement and the Compatibility Function

In order to efficiently compute combined binary measurements, a curve is approximated by a set of line segments connected by the seed points mentioned above. This approximation is accurate provided that an edge chain is broken at the high curvature points (to be detailed below), and that seed points are not very far from each other. A set of combined binary measurements for the line segments is developed in the present invention. These measurements are grouped together in an optimal way to form the combined binary measurements for curves. The compatibility function for curves can then be computed. The uncertainty measurements for the combined binary measurements are also provided.

1. Combined Binary Measurements for Line Segments

Figure 6:
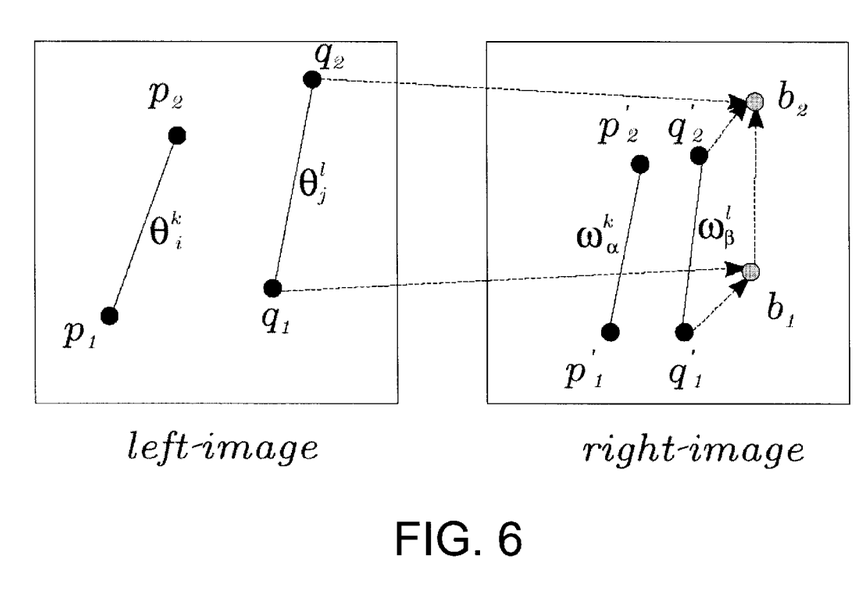
FIG. 6 is a configuration of two pairs of line segments in both images of the working example of FIG. 4.

As mentioned above, the similarity transformation is a reasonable mapping from a neighborhood in one image to the corresponding neighborhood in the other. FIG. 6, is a configuration of two pairs of line segments in both images of the working example of FIG. 4 wherein two pairs of line segments are shown. The similarity transformation $x' = sR_\theta x + t$ can be computed from $(p_1, p'_1)$ and $(p_2, p'_2)$ as described above for similarity transformation.

The following expression, $b_1 = sR_\theta q_1 + t$, $b_2 = sR_\theta q_2 + t$, is computed and forms a random vector z as the follows:

$$z = [v_1^{(x)}, v_1^{(y)}, v_2^{(x)}, v_2^{(y)}]^T \quad (16)$$

where $v_1 = b_1 - q'_1$, and $v_2 = b_2 - q'_2$. Ideally, if the local similarity transformation is valid and the point coordinates are noise-free, the result is $z = 0$. Typically, these conditions are not satisfied in practice, and thus, it is assumed that the components of z are i.i.d, and have the same standard deviations $\sigma$, i.e., $z = \mathcal{N}_z(0, \Sigma)$ where $\Sigma = \text{diag}(\{\sigma\})$.

There are several advantages of the binary measurements z given here over the traditional ones. First, measurements are invariant under the similarity transformation. Traditional measurement, such as the distance between the midpoints of line segments, may suffer from the scale change between views. Also, the set of binary measurements is complete. Under similarity transformation, two pairs of line segments have 8 equations, and there are 4 degrees of freedom for the similarity transformation. Therefore, the number of invariants is equal to 4, and the same number of measurements is produced. Further, measurements are evaluated in the same physical space, namely, they are quantified in pixels in the second image. This means that only one a for all the measurements is needed, whose computation is given below.

2. Combined Binary Measurement for Curves and the Compatibility Function

A pair of curves $a_i$ and $a_j$ is now considered. The numbers of line segments are defined as $k_i$ and $k_j$, respectively. For each line segment $k$ on the shorter curve, the closest segment from the other curve is selected, and measurement $z_k$ as defined in (16) is computed. The rationale of choosing the closest line segments is that the similarity transformation better applies to a small neighborhood than to a larger one. For the vector set $\{z_j | j \in [1, \ldots, \mathcal{K}]\}$, where $\mathcal{K} = \min(k_i, k_j)$, the following measurement vector is considered:

$$\tilde{z} = \zeta_1 z_1 + \ldots + \zeta_\mathcal{K} z_\mathcal{K} \quad (17)$$

where $\zeta_k$'s are coefficients and $$\sum_{k=1}^{K} \zeta_k = 1.$$

It is obvious that $\tilde{z}$ is also a joint Gaussian with $\tilde{z} = \mathcal{N}_{\tilde{z}}(0, \Sigma)$ where $\Sigma = \text{diag}[\{\sigma\}]$, and $$\sigma^2 = \zeta_1^2 \sigma_1^2 + \ldots + \zeta \mathcal{K}^2 \sigma \mathcal{K}^2 \quad (18)$$

Next, $\zeta_j$ is selected to minimize (18), which yields $$\zeta_i = \left[ \sigma_i^2 \sum_{j=1}^{K} \sigma_j^{-2} \right]^{-1} \quad (19)$$

Equation (17) is an unbiased estimate of the measurement error with minimal variance. The compatibility function is then given by $$p(A_{ij}^{(\alpha\beta)} | \theta_i = \omega_\alpha, \theta_j = \omega_\beta, B_{ij}) = p(\tilde{z} | \theta_i = \omega_\alpha, \theta_j = \omega_\beta, \sum) = \mathcal{N}_2\left(0, \sum\right) \quad (20)$$

where $A_{ij}^{(\alpha\beta)} = \tilde{z}$ is the combined binary measurements, and $B_{ij} = \Sigma$ is the uncertainty measurements.

3. The Distance Between Segments and the Standard Deviation

The standard deviation $\sigma$ of vector z in (17) should be a function of the distance $d$ between the line segments. This is because the local similarity assumption becomes weaker when $d$ becomes larger. The function that is used is:

$$\sigma(d) = \frac{\rho}{\sqrt{2\pi}} \left[ (1-\gamma)\left(1 - l^{-\frac{\lambda^2}{\tau^2}}\right) + \gamma \right] \quad (21)$$

where $\rho = \min(\mathcal{W}, \mathcal{H})$, $\mathcal{W}$ and $\mathcal{H}$ are respectively the image width and height, $\tau$ is a positive scalar that controls the range within which the contribution from neighboring segment is effective, and $\gamma = \sqrt{2\pi}\sigma^0/\rho$ where $\sigma^0$ is the desired standard deviation when the neighboring segment is very close to the segment under consideration. Several observations can be made for the function defined in (21):

Namely, when $d$ is small, $\sigma(d) \approx \sigma^0$ a which is the desired standard deviation when neighboring segments are close. Also, when $d$ is much larger than $\tau$, $\sigma(d) \approx \rho/\sqrt{2\pi}$. In this case, $\mathcal{N}_{\tilde{z}}(0,\Sigma) \approx 1/\rho^4$, indicating that the probabilistic density function approaches to a uniform distribution, and provides no information about the compatibility between the two pairs of line segments. Further, the intermediate value of or $\sigma(d)$ varies smoothly between the above two extreme cases.

As a consequence of the second point above, when all the distance measurements $\{d_j | j \in [1, \ldots, \mathcal{K}]\}$ are much larger than $\tau$, the compatibility function in (20) is approximately a constant $1/\rho^4$. As a result, if all the other curves are far from the current curve $a_i$, it is not difficult to see, from (8) and the definition of $Q$, that $P^{(n+1)}(\theta_i = \omega_{\theta_i}) = P^{(n)}(\theta_i = \omega_{\theta_i})$. This is in accordance with the above that the labeling probability cannot be improved when the neighborhood support is weak.

The adjustment of the parameter $\tau$ depends on the type of the scene in question. If the scene is close to the image producing device, such as a camera, there is a severe perspective distortion, and $\tau$ needs to be small enough to discard the support from curves far away. On the other hand, if the scene is far from the camera, $\tau$ could be large in order to include support from as many neighboring curves as possible.

D. Preprocessing

In the present invention, as described above, computational complexity is reduced if a seed point on one curve matches at most one seed point on the other. Also, it is assumed that in computing binary measurements, a curve is approximated by a piece-wise linear model with line segments. Two preprocessing techniques described below can be used to ensure that a seed point on one curve matches at most one seed point (epipolar breaking) and that the binary measurements are computed with a curve approximated by a piece-wise linear model (high curvature breaking). It should be noted that any suitable technique can be used to achieve the above.

1. Epipolar Breaking

When intersecting with a curve, an epipolar line may cut the same curve several times. In order to reduce the matching complexity, the epipolar line of a seed point in one image cuts at most once the corresponding curve in the other image. The technique described below breaks curves into shorter pieces, and thus, each piece only cuts an epipolar line once.

Figure 7:
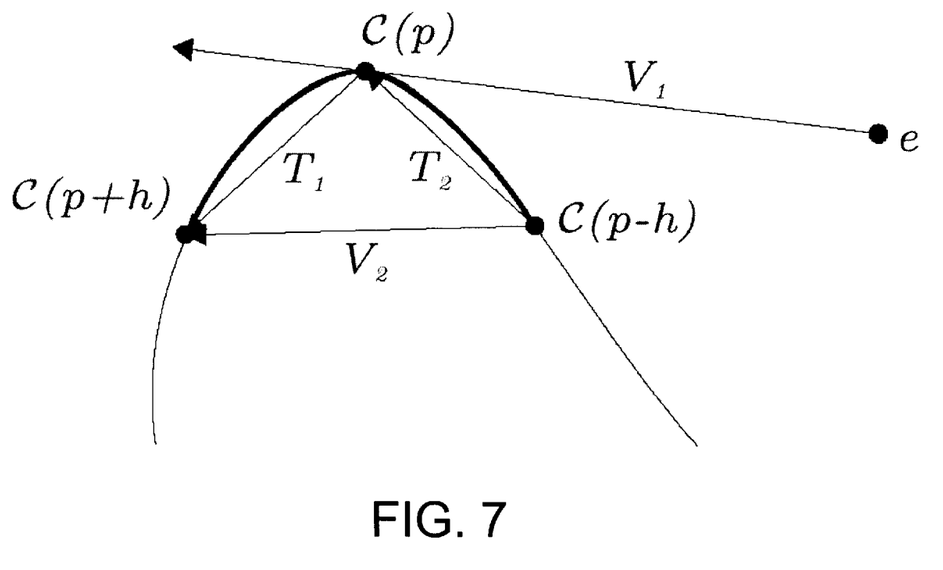
FIG. 7 is a computation of the high curvature and the epipolar breakpoint of the working example of FIG. 4 in accordance with the present invention.

FIG. 7 is a computation of the high curvature and the epipolar breakpoint of the working example of FIG. 4 in accordance with the present invention. The epipolar breaking technique of the present invention is based on the following observations. First, the only epipolar line passing through a given point p on a curve in one image is the line connecting point p and epipole l in that image, as shown in FIG. 7. Second, it is impossible for a curve to have multiple intersections with an epipolar line if there is no point on the curve whose tangent vector is parallel to the epipolar line passing through that point. As such, it follows that if a curve can be broken at the point p where the tangent vector T(p) is parallel to the epipolar line $e_p$, the problem will be solved.

Namely, the cosine of the angle between the tangent vector and the epipolar line is computed:

$$\epsilon_p = \overline{T(p)} \cdot \overline{e_p}$$

where $\overline{v}$ is the normalized vector of v. As depicted in FIG. 7, an index worm $w_p(s) = p + s, s = [-h, \ldots, h]$ of size $2h+1$, centered on the pth edge point, crawls along the edge chain, and $\epsilon_p$ is computed each time when an edge point is visited. The tangent vector T(p) is approximated by $V_2$ in FIG. 7. The original edge chain is broken at point p if its $\epsilon_p$ is the local maxima or minima, and the absolute value $|\epsilon_p|$ is larger than a predefined threshold (for example, 0.99 in one implementation). Therefore, curves are preferably not broken at reflection points.

2. High Curvature Breaking

In order to have a good piecewise linear approximation to a curve, it is necessary to break the curve at points with high curvature. The high curvature breaking technique works in a very similar way as the epipolar breaking technique described above. For instance, the curvature is approximated by $$\mathcal{K}_p = \frac{\|\overline{\mathcal{T}_1} - \overline{\mathcal{T}_2}\|}{\|\mathcal{T}_1\| + \|\mathcal{T}_2\|} \quad (22)$$

where $\mathcal{T}_1 = C(w_p(h)) - C(w_p(0))$, $\mathcal{T}_2 = C(w_p(0)) - C(w_p(-h))$, and $\overline{\mathcal{T}_j}$ denotes the normalized vector of $\mathcal{T}_j$. The original edge chain is broken at point p if its curvature $\mathcal{K}_p$ is the local maxima and is larger than a predefined threshold (0.85 in one implementation).

VI. Conclusion

The present invention performs curve matching within a probabilistic relaxation framework for determining a geometrical representation of a scene. Novel combined unary and binary measurements of the present invention are used in this framework, which are similarity-invariant. Also, the uncertainty in binary measurements is explicitly modeled, which is very important in computing the matching support from neighboring matches. Preprocessing techniques, such as epipolar breaking and high curvature breaking, contributing to the success of the curve matching have been developed and described.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for matching sets of corresponding curves, wherein each curve represents a portion of corresponding images, comprising:

performing epipolar breaking to break the curves into shorter pieces so that a seed point on one of the curves matches no more than one seed point on another corresponding curve, wherein said epipolar breaking comprises breaking a curve into parts at points where a tangent line of the curve is parallel to the epipolar line passing through that point;

representing each curve with line segments;

computing representative measurements for each line segment of each curve;

matching the line segments between corresponding curves of the images; and progressively modeling uncertainty in the representative measurements for reducing ambiguities in the matching.

2. The method of claim 1, wherein matching the line segments includes computing similarity-invariant measurements for each line segment.

3. The method of claim 2, wherein the similarity-invariant measurements are computed with binary measurements.

4. The method of claim 1, further comprising computing similarity-invariant unary measurements for each line segment.

5. The method of claim 1, wherein the line segments are created by approximating a piece-wise linear model with the line segments.

6. The method of claim 1, wherein the similarity-invariant measurements for each line segment includes a combination of unary and binary measurements.

7. The method of claim 1, further comprising determining similarities between the curves and compatibilities of the curves among neighborhood matches of the curves.

8. A method for matching a first curve of a first image to at least a second curve of a second image, comprising:

performing epipolar breaking to break the curves into shorter pieces so that a seed point on one of the curves matches no more than one seed point on the other curve, wherein said epipolar breaking comprises breaking a curve into parts at points where a tangent line of the curve is parallel to the epipolar line passing through that point, unless said point is a reflection point;

representing each curve with plural line segments;

matching the line segments of the first curve to the line segments of the second curve by computing similarity-invariant binary measurements for each line segment of each curve;

combining the binary measurements; and progressively modeling uncertainty in the combined binary measurements for reducing ambiguities in matching.

9. The method of claim 8 further comprising computing similarity-invariant unary measurements for each line segment for corner guidance.

10. The method of claim 9, wherein the unary measurements determine attributes representing at least one of orientation of a curve, intensity in a predefined neighborhood of a curve and local shape characteristics of a curve.

11. The method of claim 9, wherein the similarity-invariant measurements for each line segment includes a combination of unary and binary measurements.

12. The method of claim 8, wherein the binary measurements include attributes representing angle and distance between a pair of neighboring curves.

13. The method of claim 8, wherein the line segments are created by approximating a piece-wise linear model with the line segments.

14. A method for matching a first curve of a first image to a second curve of a second image, each being represented by line segments in an epipolar geometrical relationship, the method comprising:

determining whether each curve intersects an epipolar line more than once;

breaking the curve into multiple curves if the curve intersects an epipolar line more than once, wherein said breaking comprises breaking the curve at Points where a tangent line of the curve is parallel to the epipolar line passing through that point;

representing each curve associated with the first and second curves with plural line segments;

matching the line segments of the curves associated with the first curve to the line segments of the curves associated with the second curve by computing similarity-invariant measurements for each line segment of each curve; and progressively modeling uncertainty in the measurements for reducing ambiguities in matching.

15. The method of claim 14, further comprising ensuring that the curves approximate a suitable piece-wise linear model.

16. The method of claim 15, wherein ensuring that the curves approximate a suitable piece-wise linear model includes breaking the curves at high curvature points.

17. The method of claim 15, wherein the similarity-invariant measurements are computed with binary measurements.

18. The method of claim 17, further comprising computing similarity-invariant unary measurements for each line segment.

19. The method of claim 18, wherein the similarity-invariant measurements for each line segment includes a combination of the unary and the binary measurements.

20. The method of claim 18, wherein the binary measurements determine similarities between the curves and compatibilities of the curves among neighborhood matches of the curves.

21. The method of claim 18, wherein the unary measurements determine attributes representing at least one of orientation of a curve, intensity in a predefined neighborhood of a curve and local shape characteristics of a curve.

22. The method of claim 15, further comprising determining similarities between the curves and compatibilities of the curves among neighborhood matches of the curves.

* * * * *

UNITED STATES PATENT AND TRADEMARK OFFICE
CERTIFICATE OF CORRECTION

PATENT NO. : 6,718,062 B1  Page 1 of 2
DATED : April 6, 2004
INVENTOR(S) : Zhang et al.

It is certified that error appears in the above-identified patent and that said Letters Patent is hereby corrected as shown below:

Column 6,
Line 57,
Line 62,

Column 8,
Line 33, equation should appear as follows:

Column 10,
Line 52, equation should appear as follows:

Column 11,
Line 21,
Line 27, equation should appear as follows:
Line 32,
Line 32,
Line 32,
Line 42, equation should appear as follows:

Column 12,
Line 52,
Line 60, equation should appear as follows:
Line 62,

Column 13,
Line 1, equation should appear as follows:

Line 2, equation should appear as follows:

Line 3, equation should appear as follows:

Line 23,

Line 30, equation should appear as follows:

Line 42, delete "a"

UNITED STATES PATENT AND TRADEMARK OFFICE
CERTIFICATE OF CORRECTION

PATENT NO. : 6,718,062 B1
DATED : April 6, 2004
INVENTOR(S) : Zhang et al.

It is certified that error appears in the above-identified patent and that said Letters Patent is hereby corrected as shown below:

Column 14,
Line 42, equation should appear as follows:

Line 47,
Line 49,
Line 50,

Signed and Sealed this

Twenty-fourth Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,718,062 B1
DATED : April 6, 2004
INVENTOR(S) : Zhang et al.

It is certified that error appears in the above-identified patent and that said Letters Patent is hereby corrected as shown below:

Column 6,

Line 57, " $\mathcal{A} = \{a_1,\ldots,a\mathcal{N}\}$ " should be changed to -- $\mathcal{A} = \{a_1,\ldots,a_\mathcal{N}\}$ --

Line 62, " $\Omega = \{\omega_0,\omega_1,\ldots,\omega\mathcal{M}\}$ " should be changed to -- $\Omega = \{\omega_0,\omega_1,\ldots,\omega_\mathcal{M}\}$ --

Column 8,
Line 33, equation should appear as follows:

$$\sum_{(\omega_{\theta_j}\in\Omega, j\in\mathcal{N}_i)} P(\mathcal{L}^\lambda|X)p(\mathcal{A}_i|\mathcal{L}^\lambda,\mathcal{B}_i) = P(\theta_i = \omega_\lambda|x_i)\sum_{\omega_{\theta_1}\in\Omega} P_1^\lambda \ldots \sum_{\omega_{\theta_\mathcal{N}}\in\Omega} P_\mathcal{N}^\lambda = P(\theta_i = \omega_\lambda|x_i)\prod_{j\in N_i}\sum_{\omega_{\theta_j}\in\Omega} P_j^\lambda \quad (5)$$

Column 10,
Line 52, equation should appear as follows:

$$t = \left[\left(p_1' + p_2'\right) - sR_\theta\left(p_1 + p_2\right)\right]/2$$

Column 11,

Line 21, " $\mathcal{L}(i\mathcal{L},j_\mathcal{R})$ " should be changed to -- $\mathcal{L}(i_\mathcal{L},j_\mathcal{R})$ --

Line 27, equation should appear as follows:

$$\mathcal{L}(i_\mathcal{L},j_\mathcal{R}) = \frac{1}{\mathcal{N}_s}\sum_{\substack{k_\mathcal{L}\in s\mathcal{A}(i_\mathcal{L})\\ \ell_\mathcal{R}\in s\mathcal{A}(j_\mathcal{R})}} s(k_\mathcal{L},\ell_\mathcal{R}) \quad (14)$$

Line 32, " $\mathcal{N}$ " should be changed to -- $\mathcal{N}_s$ --
Line 32, " $i\mathcal{L}$ " should be changed to -- $i_\mathcal{L}$ --

Line 32, " $s\mathcal{A}(i\mathcal{L})$ " should be changed to -- $s\mathcal{A}(i_\mathcal{L})$ --

Line 42, equation should appear as follows:

$$P(\theta_i = \omega_\alpha|x_i^{(\alpha)}) = \frac{p(x_i^{(\alpha)}|\theta_i = \omega_\alpha)\hat{P}(\theta_i = \omega_\alpha)}{\sum_{\omega_\lambda\in\Omega} p(x_i^{(\alpha)}|\theta_i = \omega_\lambda)\hat{P}(\theta_i = \omega_\lambda)} \quad (15)$$

Column 12,

Line 52, " $z\mathcal{R}$ " should be changed to -- $z_\mathcal{R}$ --

UNITED STATES PATENT AND TRADEMARK OFFICE
CERTIFICATE OF CORRECTION

PATENT NO. : 6,718,062 B1
DATED : April 6, 2004
INVENTOR(S) : Zhang et al.

It is certified that error appears in the above-identified patent and that said Letters Patent is hereby corrected as shown below:

Column 12 (cont'd),
Line 60, equation should appear as follows:

$$\tilde{z} = \zeta_1 z_1 + \cdots + \zeta_K z_K \qquad (17)$$

Line 62, "$\zeta_k\text{'s}$" should be changed to -- $\zeta_k\text{'s}$ --

Column 13,
Line 1, equation should appear as follows:

$$\tilde{z} = \mathcal{N}_{\tilde{z}}\left(0, \tilde{\Sigma}\right)$$

Line 2, equation should appear as follows:

$$\tilde{\Sigma} = \text{diag}[\{\tilde{\sigma}\}]$$

Line 3, equation should appear as follows:

$$\tilde{\sigma}^2 = \zeta_1^2 \sigma_1^2 + \cdots + \zeta_K^2 \sigma_K^2 \qquad (18)$$

Line 23, "$B_{ij} = \Sigma$" should be changed to -- $B_{ij} = \tilde{\Sigma}$ --

Column 13,
Line 30, equation should appear as follows:

$$\sigma(d) = \frac{\rho}{\sqrt{2\pi}}\left[(1-\gamma)\left(1 - e^{-\frac{d^2}{r^2}}\right) + \gamma\right] \qquad (21)$$

Line 42, delete "a"

UNITED STATES PATENT AND TRADEMARK OFFICE
CERTIFICATE OF CORRECTION

PATENT NO. : 6,718,062 B1
DATED : April 6, 2004
INVENTOR(S) : Zhang et al.

It is certified that error appears in the above-identified patent and that said Letters Patent is hereby corrected as shown below:

<u>Column 14,</u>
Line 42, equation should appear as follows:

$$\varepsilon_p = \overline{T(p)} \cdot \overline{e_p}$$

Line 47, "$\epsilon_p$" should be changed to -- $\varepsilon_p$ --
Line 49, "$\epsilon_p$" should be changed to -- $\varepsilon_p$ --
Line 50, "$|\epsilon_p|$" should be changed to -- $|\varepsilon_p|$ --

This certificate supersedes Certificate of Correction issued August 24, 2004.

Signed and Sealed this

Ninth Day of November, 2004

JON W. DUDAS
*Director of the United States Patent and Trademark Office*